(12) United States Patent
Ishii

(10) Patent No.: US 7,519,285 B2
(45) Date of Patent: Apr. 14, 2009

(54) IMAGING APPARATUS, IMAGING METHOD, IMAGING PROGRAM, AND STORAGE MEDIUM

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 11/322,697

(22) Filed: Dec. 30, 2005

(65) Prior Publication Data

US 2006/0165402 A1     Jul. 27, 2006

(30) Foreign Application Priority Data

Jan. 24, 2005    (JP)   .............................. 2005-016190

(51) Int. Cl.
     *G03B 13/36*      (2006.01)

(52) U.S. Cl. ........................ 396/102; 396/121; 396/147

(58) Field of Classification Search .......... 396/121–123
See application file for complete search history.

(56) References Cited

U.S. PATENT DOCUMENTS 5,091,742 A    2/1992    Fukahori et al.
5,361,119 A * 11/1994   Shida et al. .................. 396/121
6,670,992 B2 * 12/2003   Irie ............................. 348/350
6,801,717 B1 * 10/2004   Hofer .......................... 396/121

FOREIGN PATENT DOCUMENTS

| JP | 2-254432 A | 10/1990 |
|----|-----------|---------|
| JP | 5-232371 A | 9/1993 |
| JP | 7-072764 A | 3/1995 |
| JP | 2003-98421 A | 4/2003 |
| JP | 2003-241067 A | 8/2003 |

* cited by examiner

*Primary Examiner*—W. B. Perkey
(74) *Attorney, Agent, or Firm*—Canon U.S.A., Inc., IP Division

(57) ABSTRACT

At least one exemplary embodiment is directed to an imaging apparatus including: a detecting device; a selecting device; a determining device; and a instructing device configured to instruct the determining device to display on an imaging screen at least one AF frame determined to be within a focusing range, where the focusing range is the range of a positions of an imaging optical system positioned within a predetermined depth of focus of a focusing position selected by the selecting device.

8 Claims, 10 Drawing Sheets

IMAGING APPARATUS, IMAGING METHOD, IMAGING PROGRAM, AND STORAGE MEDIUM

BACKGROUND OF THE INVENTION

1. Field of the Invention

The present invention relates to an imaging apparatus, imaging method, imaging program, and storing medium, more particularly though not exclusively, including an automatic focusing function having multiple focal point detecting regions.

2. Description of the Related Art

Heretofore, the following arrangements have been discussed as a range-finding frame display method of an imaging apparatus. First, the subject distances of subjects to be displayed on multiple regions within a photographing screen are each measured, using an external range-finding sensor. Subsequently, determination is made regarding whether or not subjects other than an in-focus subject are included in the range of depth of field. Subsequently, the subject included in the depth of field is displayed on a screen such that the photographer can view the subject (e.g., Japanese Patent Laid-Open No. 05-232371).

Also, a conventional rear focus lens system included in a video camera, has a relationship between subject distance, focal length, and focus lens position where a focus lens can bring a subject image into focus (hereinafter, referred to as "focusing lens position").

FIG. 9 is a graph illustrating the relationship between subject distance, focal length, and focusing lens position. The multiple curves shown in FIG. 9 illustrate the relationship between the focal length and the focus lens position at each certain subject distance.

The rear focus lens system maintains a focused state when a zoom lens performs zooming operation by moving the focus lens in accordance with the curve corresponding to the focal length of the zoom lens.

Further, a conventional imaging apparatus has been discussed which uses multiple focal point detecting regions. First, multiple focal point detecting regions are set within a photographing screen, and a focal point detection is made in each focal point detecting region, thereby detecting a focusing lens position for each region. Subsequently, one focusing lens position is eventually determined. (e.g., Japanese Patent Publication No. 07-072764).

However, with the conventional imaging apparatus, the difference of focusing lens positions caused due to the difference between subject distances becomes smaller as the focal length becomes shorter, and becomes greater as the focal length becomes longer (see FIG. 9). The depth of focus in the case of a short focal length is around one half of the depth of focus in the case of a long focal length (see FIG. 10). Accordingly, the depth of focus does not proportionally become less deep as the focal length becomes shorter near the shorter side of the focal length (see FIG. 10).

Consequently, because the difference in focusing lens position between the far and near subject distance decreases when going from the mid focal length value to the short focal length value, the ratio of the depth of focus to the difference of focusing lens positions caused due to the difference between subject distances becomes greater as the focal length becomes shorter. Thus, the range of a subject distance included in the depth of focus becomes wider, i.e. more of the subject distance positions (e.g., positions between near and far) lie within the depth of focus. Contrarily, the ratio of the depth of focus to the difference of focusing lens positions caused due to the difference between subject distances becomes smaller as the focal length becomes longer. Thus, the range of subject distance included in the depth of focus becomes narrower.

Now, for example, let us consider a case where, with a photographing screen including range-finding frames 51a, 52a, and 53a serving as focal point detecting regions such as shown in FIG. 11, photographing is performed using a picture composition in which another subject (pillar in FIG. 11) is present at a position (e.g., around 2 m behind the main subject) in the range-finding frame 52a. In this case, when the focal length is short, the difference between focusing lens positions of the focus lens caused due to the difference between subject distances (e.g., the distances between the pillar and the main subject) is small (see FIG. 9). Accordingly, there is the possibility that all of the focusing lens positions of the range-finding frames 51a, 52a, and 53a are included in the depth of field or the depth of focus (see FIG. 12), in which case the photographer cannot determine which subject the focus lens has focused upon.

SUMMARY OF THE INVENTION

At least one exemplary embodiment is directed to an imaging apparatus, imaging method, imaging program, and storing medium, such as a single lens reflex camera, video camera, which include an automatic focusing (hereafter referred to as "AF") function having multiple focal point detecting regions, and display a focusing region on a screen. Additionally at least one exemplary embodiment can visually display a focusing state.

At least one exemplary embodiment is directed to an imaging apparatus including: a focal point detecting device configured to detect focus states of multiple positions of an imaging region; a focusing lens position control device configured to drive a focus lens to a focusing position based on the detected focus state; a lighting device configured to light a region corresponding to a position where the focus state is detected; and a modifying device configured to drive the focus lens to a focusing position using the focusing lens position control device, and also modifying a threshold value regarding whether or not the region of the lighting device is to be lit as to the depth of focus of the focus lens depending on the focal length thereof.

At least one exemplary embodiment is directed to an imaging method including: a focal point detecting step for detecting focus states of multiple positions of an imaging region; a focusing lens position control step for driving a focus lens to a focusing position based on the detected focus state; a lighting step for lighting a region corresponding to a position where the focus state is detected; and a modifying step for driving the focus lens to a focusing position using the focusing lens position control step, and also modifying a threshold value regarding whether or not the region in the lighting step is to be lit as to the depth of focus of the focus lens depending on the focal length thereof.

Additionally at least one exemplary embodiment is directed to an imaging program including: a focal point detecting module configured to detect focus states of multiple positions of an imaging region; a focusing lens position control module configured to drive a focus lens to a focusing position based on the detected focus state; a lighting module configured to light a region corresponding to a position where the focus state is detected; and a modifying module configured to drive the focus lens to a focusing position using the focusing lens position control module, and also modifying a threshold value regarding whether or not the region in the lighting module is to be lit as to the depth of focus of the focus lens depending on the focal length thereof.

At least one exemplary embodiment is directed to a storing medium which can store the imaging program as described above.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments.

DESCRIPTION OF THE EMBODIMENTS

Figure 1:
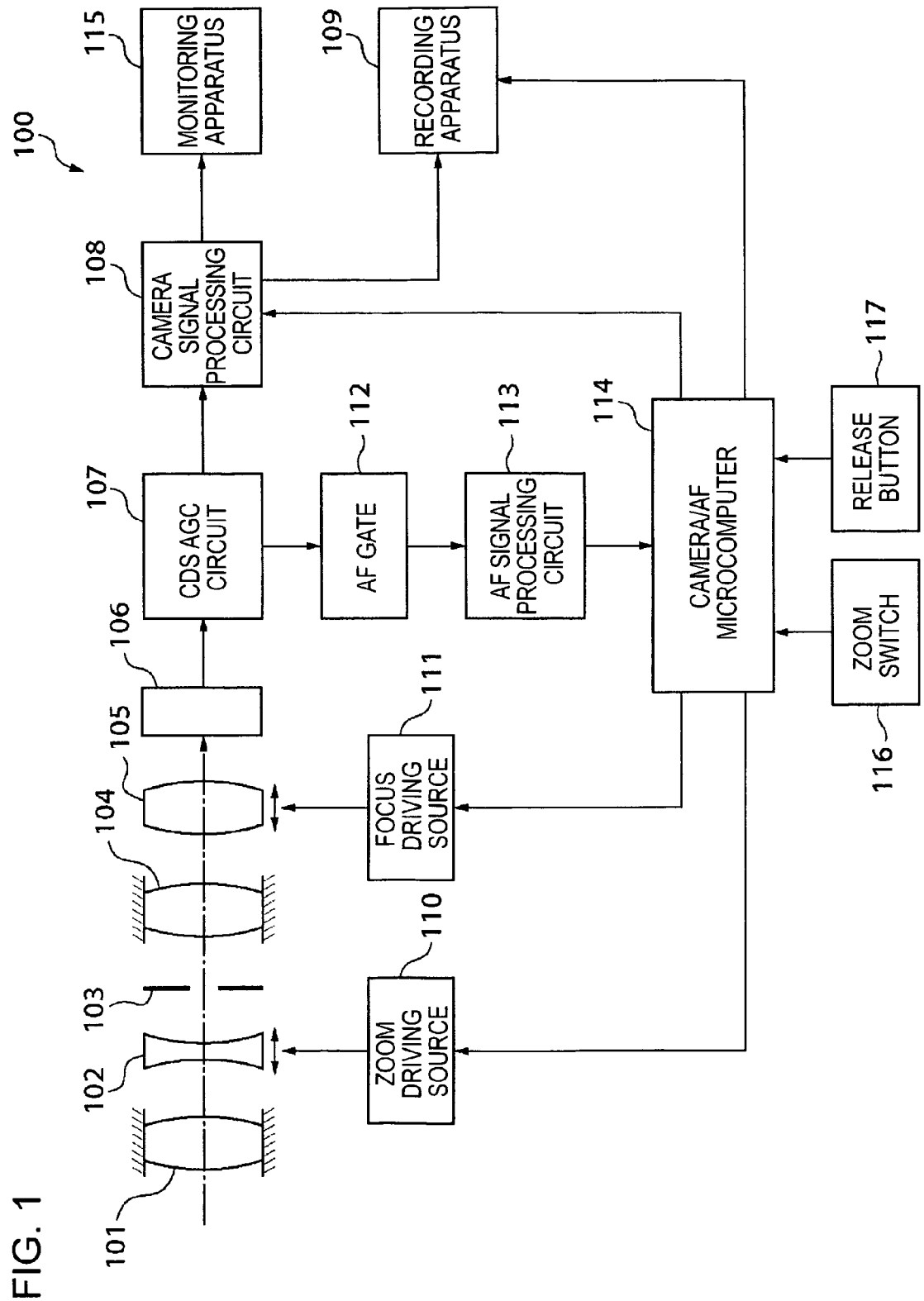
FIG. 1 is a block diagram schematically illustrating the configuration of an imaging apparatus according to at least one exemplary embodiment.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example certain circuitry for an AF signal processing circuit, a camera signal processing circuit, and others may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it can not be discussed for following figures.

An exemplary embodiment will be described in detail in accordance with the accompanying drawings. However, the dimensions, shapes and relative positions of the constituent parts shown in the exemplary embodiments should be changed as convenient depending on various conditions and on the structure of the apparatus adapted to the invention, and the invention is not limited to the exemplary embodiments described herein.

Hereinafter, detailed description will be made regarding an exemplary embodiment with reference to the drawings. FIG. 1 is a block diagram schematically illustrating the configuration of an imaging apparatus according to at least one exemplary embodiment.

A video camera system 100 serving as a non-limiting example of an imaging apparatus in FIG. 1 includes, from the subject side: a first fixed lens group 101; a variable-power lens group (zoom lens) 102 for changing the power; a diaphragm 103; a second fixed lens group 104; a lens group (focus lens) 105 including a focus adjustment function, and also a compensator lens function configured to perform correcting movement in focal plane due to change in the power; a CCD 106 serving as a non-limiting example of an imaging device, which has a imaging face, for photoelectric conversion of an optical subject image into an output signal (e.g., video signal output); a correlated double sampling (CDS) automatic gain control (AGC) circuit 107 configured to amplify the output from the CCD 106; a camera signal processing circuit 108 for converting the output signal from the CDSAGC circuit 107 into a signal corresponding to a later-described recording apparatus 109 and monitoring apparatus 115; a recording apparatus 109 for recording the signal converted by the camera signal processing circuit 108; and a monitoring apparatus 115 for displaying the signal converted by the camera signal processing circuit 108. The recording apparatus 109 records moving images and still images, and has a recording medium (e.g., magnetic tape, semiconductor memory, or other memory capable of recording data as known by one of ordinary skill in the relevant arts and equivalents).

The video camera system in FIG. 1 further includes: a zoom driving source 110 configured to drive the zoom lens 102; a focus driving source 111 configured to drive the focus lens 105; an AF gate 112 configured to set a range-finding frame which is a range for extracting a signal which facilitates focusing from the video signal amplified by the CDSAGC circuit 107; an AF signal processing circuit 113 configured to extract high-frequency components, low-frequency components, and illumination difference components (difference between the maximum value and minimum value of the illumination level of the video signal), which can be employed for focal point detection; a camera/AF microcomputer 114 which is connected to each of the zoom driving source 110, focus driving source 111, AF signal processing circuit 113, camera signal processing circuit 108, and recording apparatus 109, and a zoom switch 116 and a release button 117, which are connected to the camera/AF microcomputer 114.

The AF gate 112 is variable in the size thereof, and a plurality of the AF gates 112 can be used in other exemplary embodiments.

Figure 2:
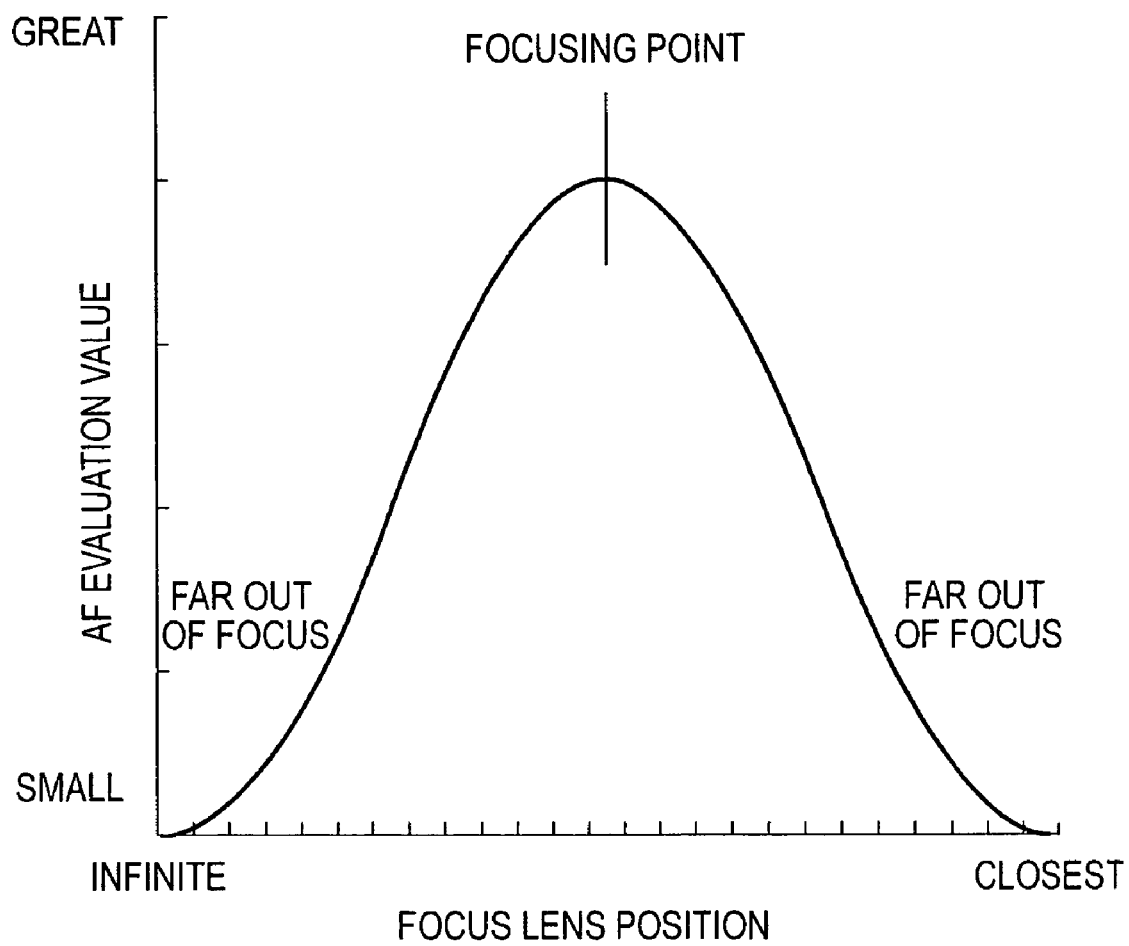
FIG. 2 is a graph illustrating the relationship between a focus lens and an AF evaluation value.

The camera/AF microcomputer 114 controls the focus lens 105 based on the output signal of the AF signal processing circuit 113; reads in the operating information of the zoom switch 116 to perform zoom control; and also controls the output signal of the camera signal processing circuit 108. The camera/AF microcomputer 114 can perform automatic focus (AF) adjustment by moving the focus lens 105 such that the output signal level of the AF signal processing circuit 113 becomes maximum. With this method, first, high-frequency components indicating the sharpness of a subject image using a band-pass filter are extracted as AF evaluation values from the video signal obtained by subjecting the subject image to photoelectric conversion using the CCD 106 or the like. Subsequently, the focus lens 105 is driven and controlled so as to detect the position of the focus lens 105, a "focusing lens position", where the extracted AF evaluation value becomes the maximum. As shown in FIG. 2, there is the relationship between a focus lens position and an AF evaluation value, and the focus lens position where an AF evaluation value becomes the maximum is the focusing position.

Figure 3:
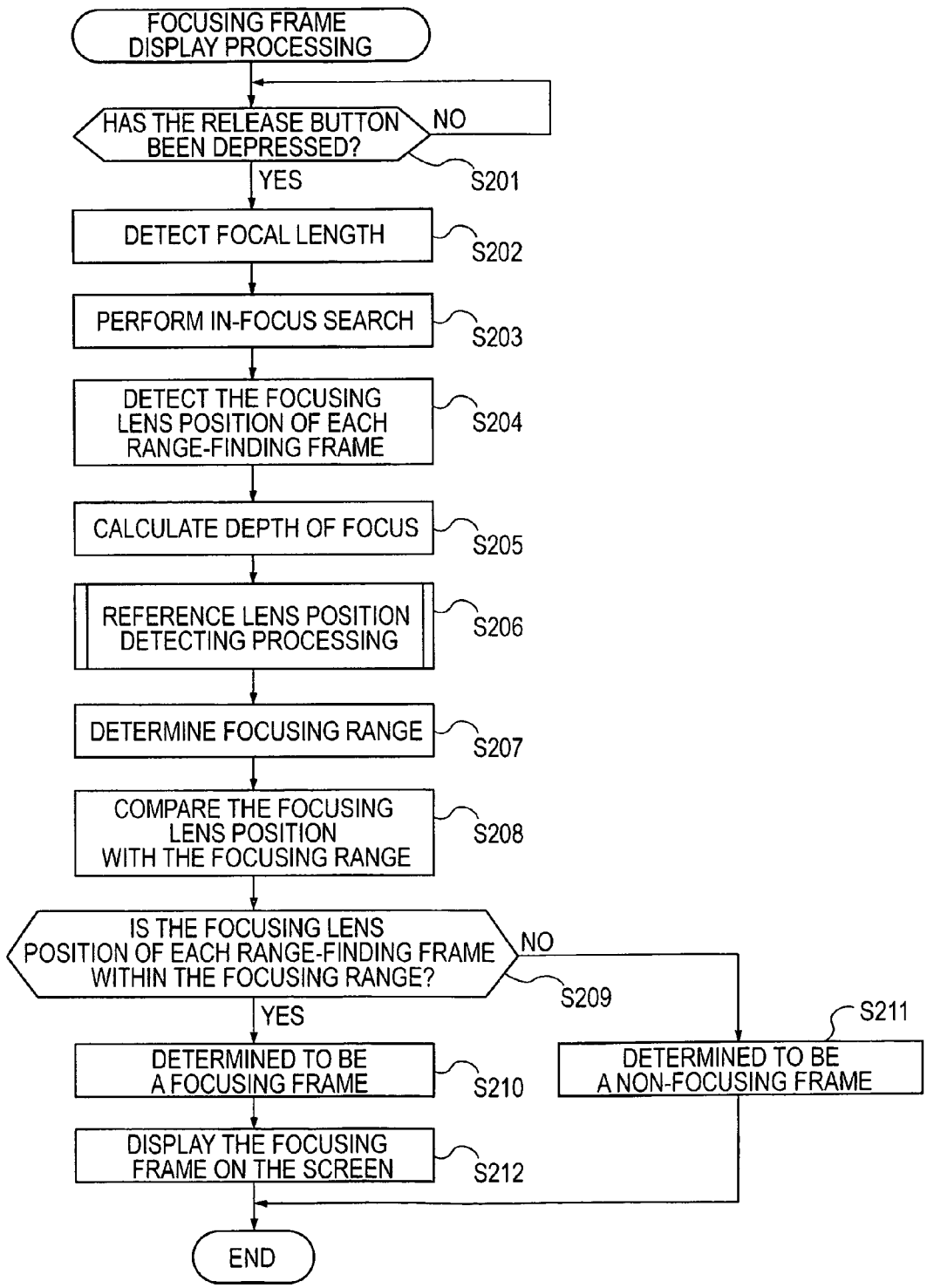
FIG. 3 is a flowchart illustrating focusing frame display processing procedures to be executed by a video camera system.

FIG. 3 is a flowchart illustrating focusing frame display processing procedures to be executed by the video camera system 100 in FIG. 1. The camera/AF microcomputer 114 can execute the processing in FIG. 3.

In FIG. 3, upon the release button 117 being depressed (YES in Step S201), the camera/AF microcomputer 114 detects a focal length (Step S202), and performs an in-focus search by scanning the focus lens 105 to obtain the corresponding relationship between a focus lens position and the AF evaluation value for each range-finding frame (Step S203) (see FIG. 2). Subsequently, following detecting the focusing lens position serving as the focus lens position where the AF evaluation value for each range-finding frame becomes the maximum using the corresponding relationship obtained for each range-finding frame (Step S204), the camera/AF microcomputer 114 calculates the current depth of focus (Step S205).

In the subsequent Step S206, reference lens position detecting process is performed. That is to say, of the focusing lens positions output for each range-finding frame in Step S204, the camera/AF microcomputer 114 obtains a focus lens position where the focus lens 105 can most likely bring the main subject image into focus. Also, the camera/AF microcomputer 114 sets the relevant lens position to a reference lens position, and the flow proceeds to Step S207.

The range of focus lens positions where a photographed subject image can be determined to be in focus is referred to as a focusing range. Control is such that when the focusing lens positions of the respective range-finding frames are included in the focusing range, a focusing display is performed, but when the focusing lens positions of the respective range-finding frames are not included in the focusing range, the focusing display is not performed.

This focusing range is a range to be set within the depth of focus centered on the reference lens position set in Step S206, and is set such that the proportion between the focusing range and the depth of focus varies depending on the focal length (Step S207).

Figure 4:
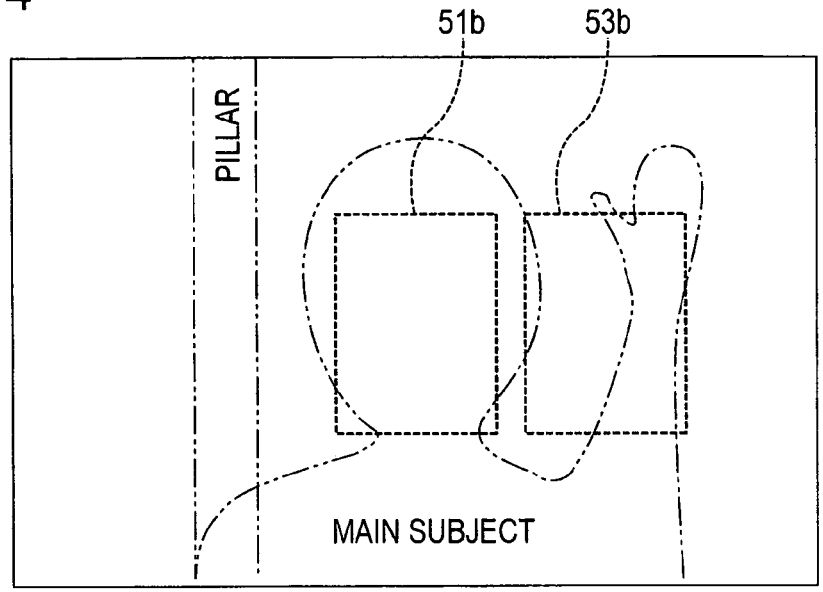
FIG. 4 is a diagram describing the focusing frame display in Step S212 in FIG. 3.

Comparison is made between the focusing lens position of each range-finding frame and the focusing range (Step S208), and determination is made regarding whether or not the focusing lens position of each range-finding frame is included in the focusing range (Step S209). When a focusing lens position is not included in the focusing range, the relevant range-finding frame is determined to be a non-focusing frame (Step S211), and the present processing ends. Also, when a focusing lens position is included in the focusing range, the relevant range-finding frame is determined to be a focusing frame (Step S210). Subsequently, a frame having the same position and size as the range-finding frame, that is determined to be a focusing frame, is displayed on the screen of the monitoring apparatus 115 to perform the focusing display (Step S212) (lighting device) (see FIG. 4), and then the present processing ends. Thus, the photographer can visually confirm a region which is in focus. Here, a range on the screen of the monitoring apparatus 115 (FIG. 1) which the AF brings into focus is referred to as an AF frame.

Figure 5:
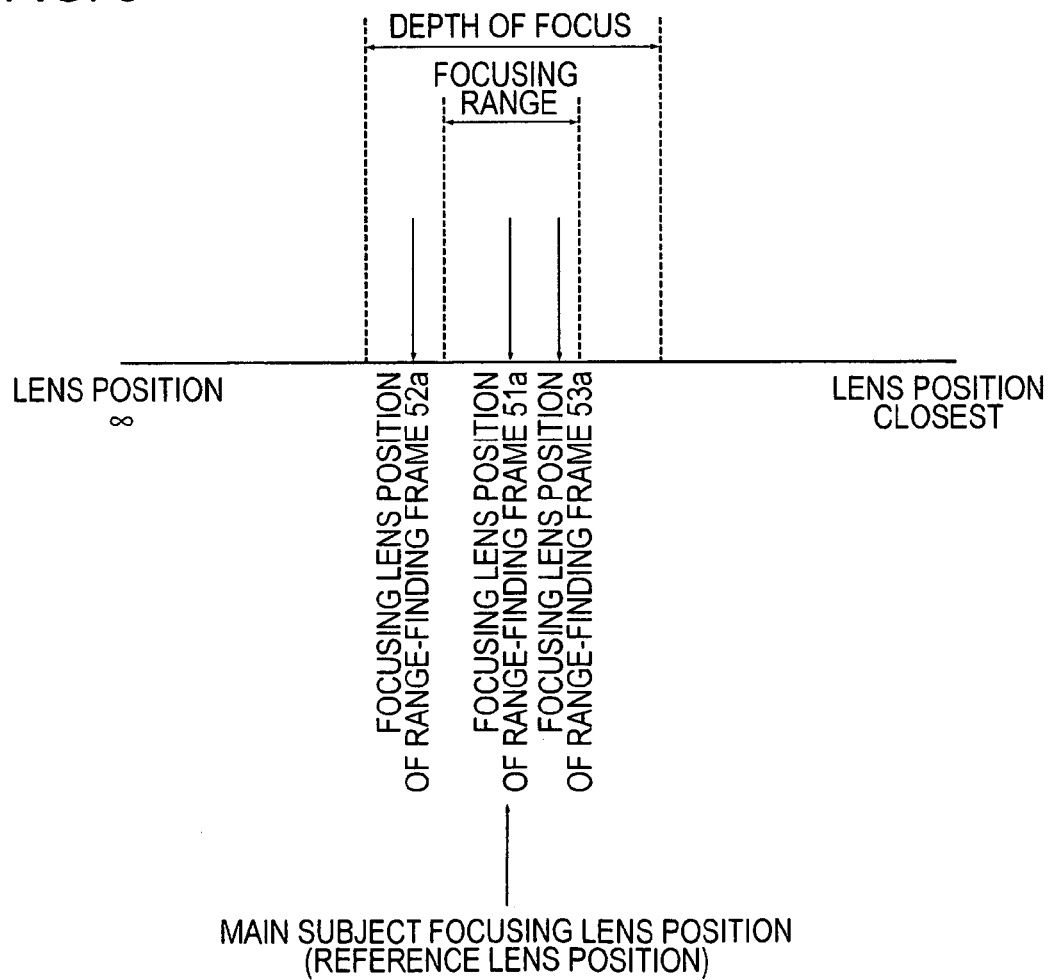
FIG. 5 is a diagram describing the focusing lens positions, depth of focus, and focusing range in Step S207 in FIG. 3, illustrating the case of a short focal length.
Figure 6:
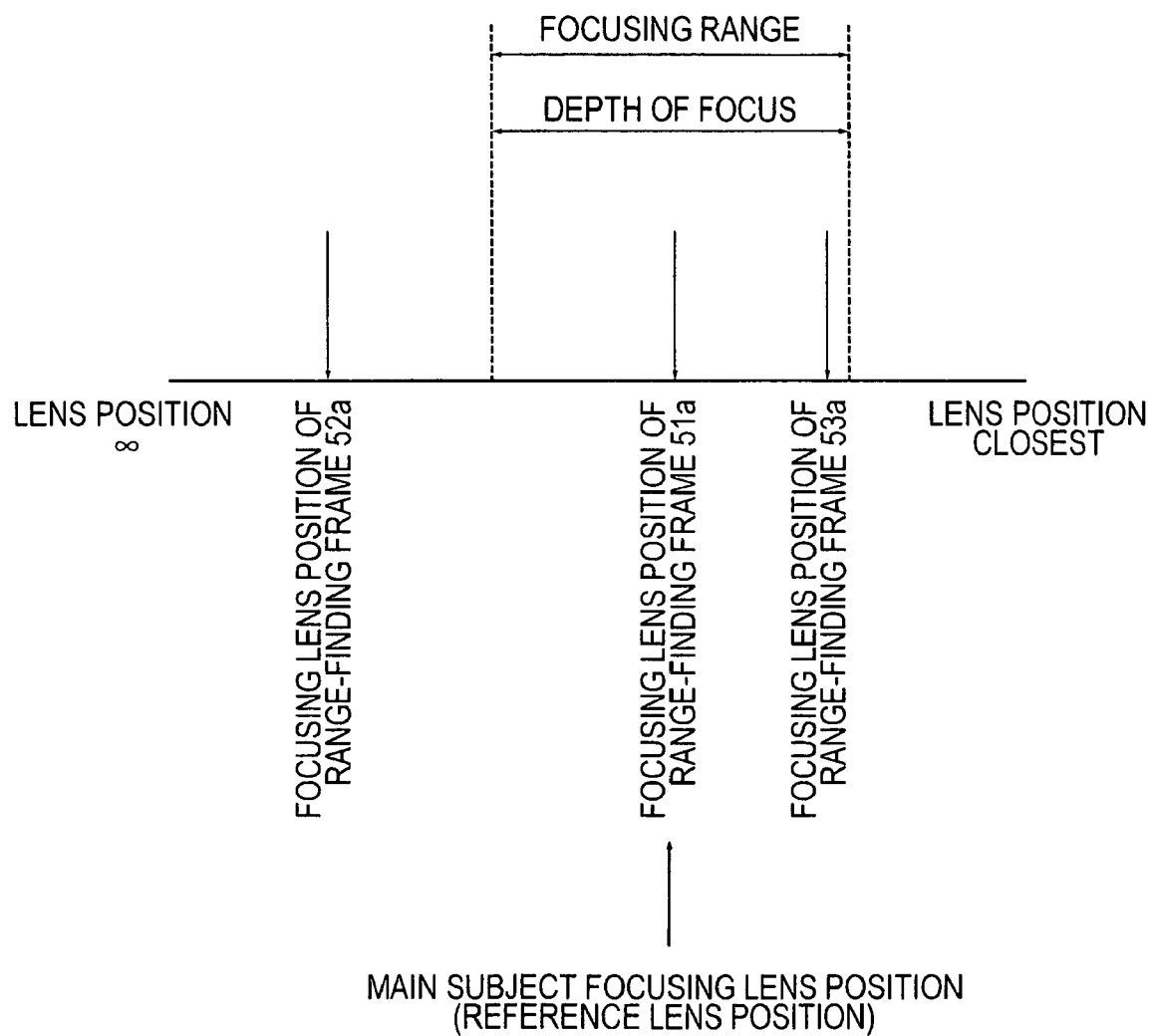
FIG. 6 is a diagram describing the focusing lens positions, depth of focus, and focusing range in Step S207 in FIG. 3, illustrating the case of a long focal length.

With the processing in Step S207, for example, in the event that the focal length of the zoom lens 102 is the wide-angle end (W end), the focusing range can be set to one half or less of the depth of focus (see FIG. 5). Also, in the event the focal length is the telephoto end (T end), the focusing range can be set to be equal to the depth of focus (see FIG. 6). Also, in the event that the focal length of the zoom lens 102 is between the W end and the T end, the focusing range can be set so as to be proportional to the movement distance of the focus lens 105 to the focal length within the focusing range set in the case of the W end or the T end.

In other words, the proportion of the focusing range to the depth of focus is set to be smaller as the focal length becomes shorter, and the proportion of the focusing range to the depth of focus is set to be greater as the focal length becomes longer. Thus, when the focal length is short, a region which is in focus at the maximum is displayed, thereby preventing multiple range-finding frames corresponding to multiple subjects from being displayed as a focusing frame.

Now, the above depth of focus is a depth of focus to be calculated when the diaphragm 103 is in an opened state. Also, as the aperture (f-stop) of the diaphragm 103 becomes greater, the depth of focus becomes deeper, so that in some exemplary embodiments, the focusing lens position of each region is included in the focusing range, and thus, the focusing range may be narrowed depending on the aperture (f-stop).

Thus calculating a focusing range related to the depth of focus in an opened diaphragm 103 state, the focusing range can be further narrowed depending on the aperture (f-stop).

When the focusing range is narrowed depending on the aperture (f-stop), the focusing range can be narrowed with a proportion smaller than a proportion for narrowing the focusing range depending on a focal length.

Also, a lower limit can be provided without narrowing the focusing range with the same proportion depending on the aperture (f-stop).

According to the processing in FIG. 3, a focusing state can be displayed without giving the photographer a mixed focusing display.

Figure 7:
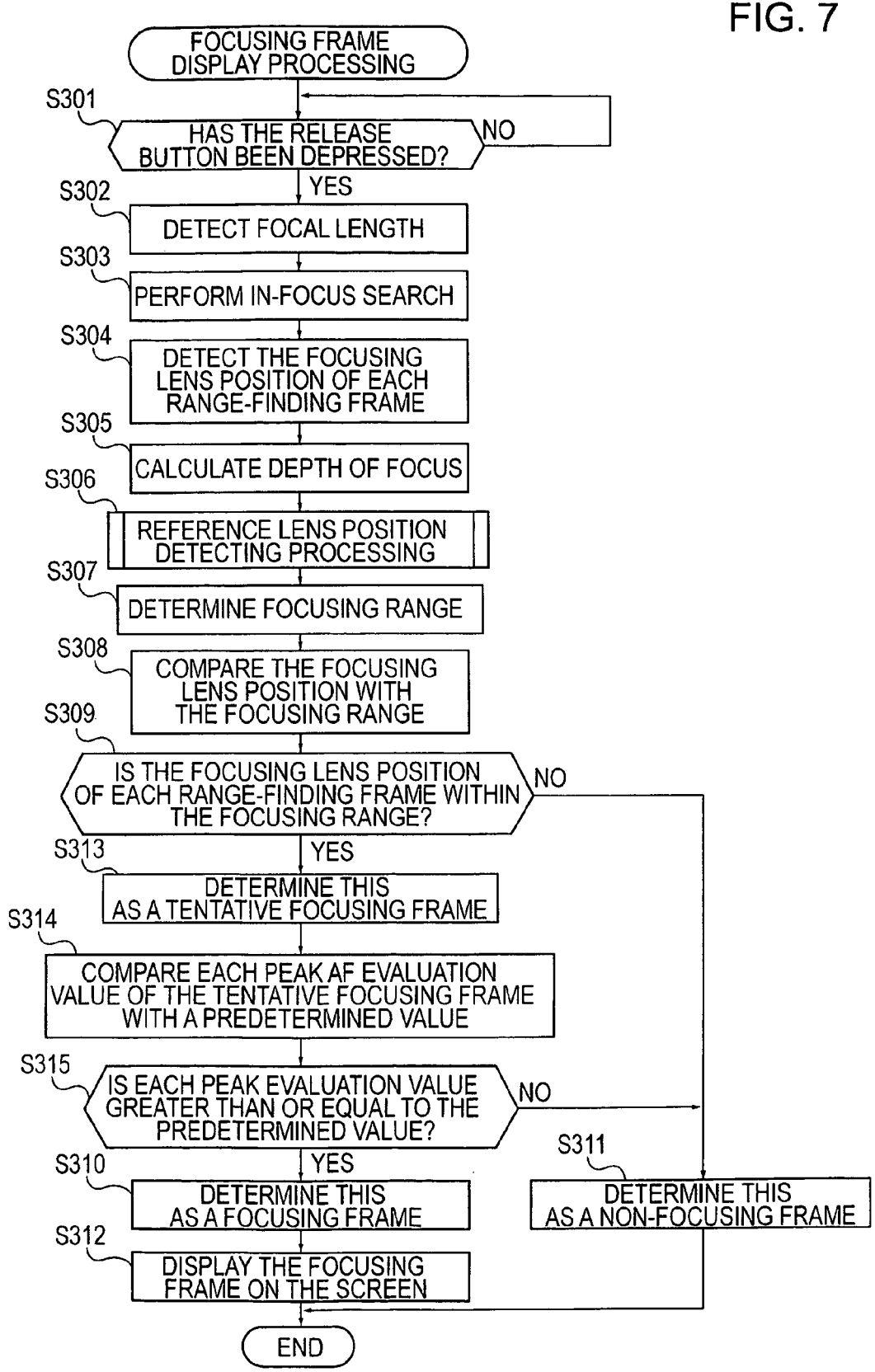
FIG. 7 is a flowchart illustrating the procedures of a modification example of the focusing frame display processing in FIG. 3.

FIG. 7 is a flowchart illustrating the procedures of a modification example of the focusing frame display process in FIG. 3. The camera/AF microcomputer 114 executes the process in FIG. 7.

In FIG. 7, description of the same processing as that of each step in FIG. 3 will be omitted, with the step numbers being simply changed from the two-hundreds into three-hundreds. Only the processing different from the steps in FIG. 3 will be described below.

With the processing in FIG. 7, Steps S301 through S309 are the same as the processing in FIG. 2 corresponding to steps S201-S209, focal point detection is performed using in-focus search, the focusing lens positions of multiple range-finding frames are obtained, and determination is made regarding whether or not the focusing lens position of each range-finding frame is included in the focusing range for each range-finding frame.

As a result of the determination in Step S309, when the focusing lens position of a range-finding frame is included in the focusing range, the relevant range-finding frame is determined to be a tentative focusing frame (Step S313). Subsequently, the maximum AF evaluation value of each tentative focusing frame is calculated and compared with a later-described predetermined value (Step S314), and determination is made regarding whether or not the maximum AF evaluation value of each tentative focusing frame is greater than a later-described predetermined value (Step S315).

As a result of the determination, when the maximum AF evaluation value of each tentative focusing frame is greater than or equal to a later-described predetermined value, the relevant range-finding frame is determined to be a focusing frame (Step S310). Subsequently, in order to allow the photographer to visually confirm a region which is currently in focus, a frame having the same position and size as the range-finding frame to be determined to be a focusing frame is displayed on the screen of the monitoring apparatus 115 (Step S312), and then the present processing ends.

As a result of the determination in Step S309, when the focusing lens position of a range-finding frame is not included in the focusing range, the relevant range-finding frame is determined to be a non-focusing frame (Step S311), and then the present processing ends. Also, as a result of the determination in Step S315, when the maximum AF evaluation value of each tentative focusing frame is smaller than the predetermined value, the relevant range-finding frame is determined to be a non-focusing frame (Step S311), and then the present processing ends.

As a result of the determination in Step S315, when the maximum AF evaluation value of each tentative focusing frame is smaller than the predetermined value, in other words, when the same main subject is employed but the AF evaluation value is small, the region thereof is a region where influence of noise due to low contrast and low illumination is readily received. Also, the detected focusing lens position can be conceived to be low in reliability. Accordingly, even in the event that the range-finding frame thereof is displayed on the monitoring screen 115, a subject which the photographer actually intends is not always included in the region of the displayed focusing frame. Also, it is difficult for the photographer to determine regarding whether or not the focus lens 105 is focused on the subject. As described above, displaying a region of which the AF evaluation value is small on the monitoring screen 115 as a focusing frame gives the photographer a feeling that the device is not trustworthy (mixed focusing display), so this is determined to be a non-focusing frame.

In Step S314, a predetermined value is calculated by extracting the tentative focusing frame having the greatest AF evaluation value of the tentative focusing frames, and multiplying the relevant AF evaluation value by a predetermined percentage.

According to the processing in FIG. 7, when the focusing lens position of a range-finding frame is included in the focusing range (YES in Step S309), the relevant range-finding frame is determined to be a tentative focusing frame (Step S313). Subsequently, the maximum AF evaluation value of each tentative focusing frame is calculated, and when the maximum AF evaluation value of each tentative focusing frame is smaller than the predetermined value, the relevant range-finding frame is determined to be a non-focusing frame (Step S311). Accordingly, the detection results of focusing lens positions having low reliability can be ignored, and thus, a focusing state can be correctly displayed without giving the photographer an uncomfortable feeling (a mixed focusing display).

Figure 8:
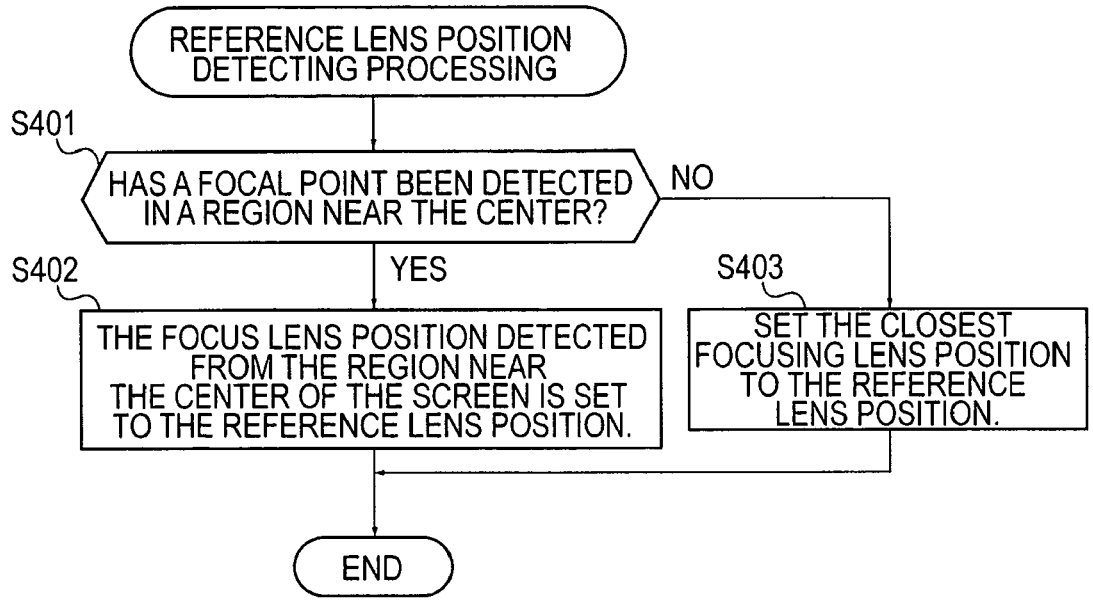
FIG. 8 is a flowchart illustrating the reference lens position calculation procedures in Step S206 in FIG. 3 and in Step S306 in FIG. 7.

FIG. 8 is a flowchart illustrating the reference lens position calculation procedures in Step S206 in FIG. 3 and in Step S306 in FIG. 7.

The camera/AF microcomputer 114 executes the processing in FIG. 8. In FIG. 8, determination is made regarding whether or not a focal point has been detected in a region including near the center of the screen (Step S401) (another determining device). As a result of the determination, when a focal point has been detected in a region including near the center of the screen (Step S401), the focusing lens position detected from the region including near the center of the screen is set to the reference lens position (Step S402). Also, in the event that a focal point has not been detected in the region, including near the center of the screen, of the focusing lens positions where focus has been detected from the other multiple regions, the closest focusing lens position is set to the reference lens position (Step S403), and then the processing ends.

At least one exemplary embodiment includes the method where the focusing lens positions where a focus has been detected from the other multiple regions, the closest focusing lens position can be set to the reference lens position, but in this case, even in the event that the focusing lens positions of the other regions converge at relatively the same position, the closest subject is brought into focus. In particular, when the angle of field is wide, the other subjects frequently exist closer than the main subject, and consequently, a subject which the photographer does not intend to focus upon is sometimes brought into focus. Accordingly, the determination such as in Step S401 is performed, since in general, the subject is usually near the center of the screen.

However, when a focusing lens position has not been detected from the region, including near the center of the screen, a picture composition of the main subject and the background can be conceived in many cases. In this case, the main subject is frequently disposed closest, and thus the focusing lens position disposed closest is set to the reference lens position.

According to the processing in FIG. 8, an appropriate reference lens position can be detected in accordance with a picture composition, and thus, a focusing state can be more correctly displayed without giving the photographer an uncomfortable feeling (a mixed focusing display).

Figure 9:
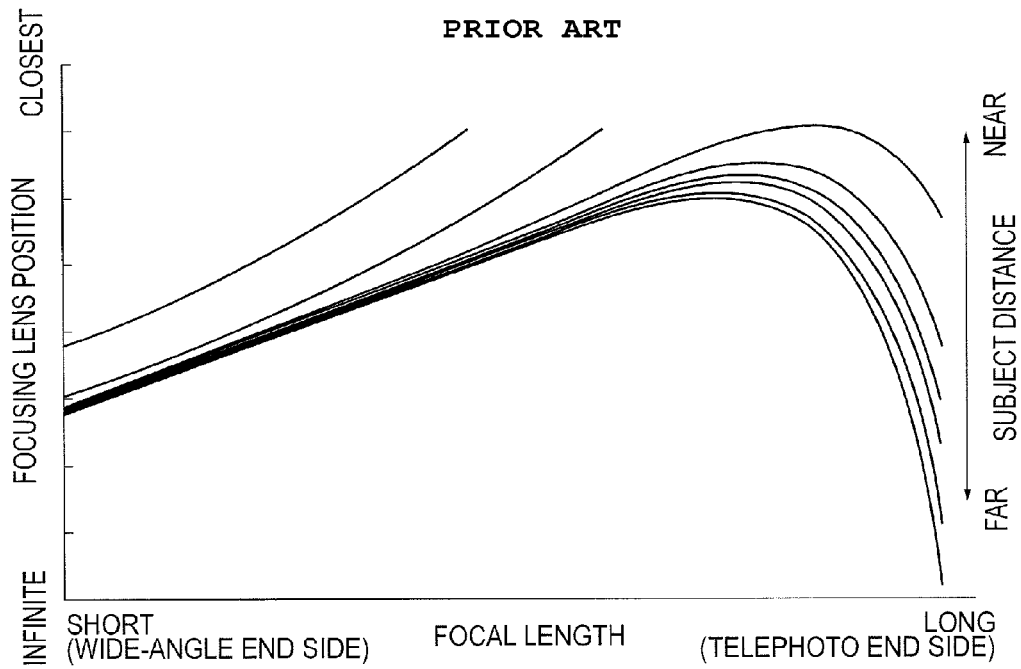
FIG. 9 is a graph illustrating the relationship between subject distance, focal length, and focusing lens position in a conventional imaging apparatus.
Figure 10:
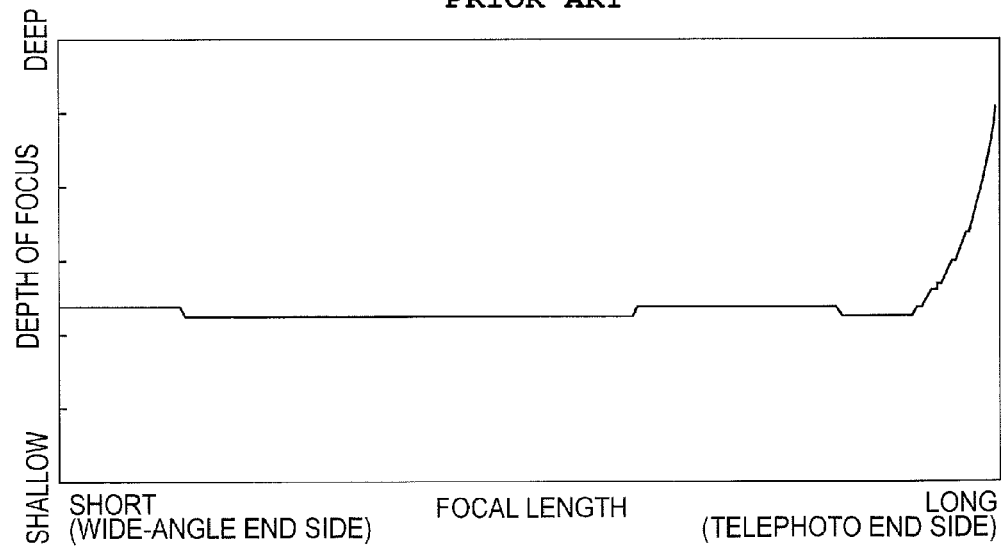
FIG. 10 is a graph illustrating the relationship between focal length and depth of focus in the conventional imaging apparatus.
Figure 11:
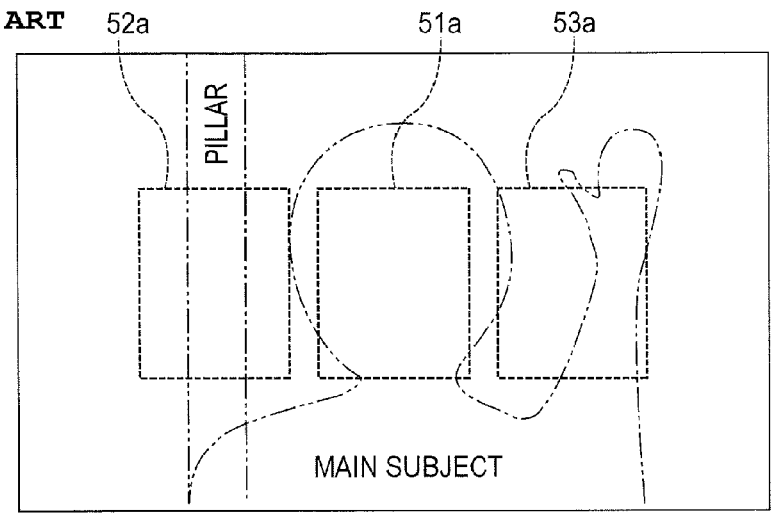
FIG. 11 is a diagram describing range-finding frames in the conventional imaging apparatus.
Figure 12:
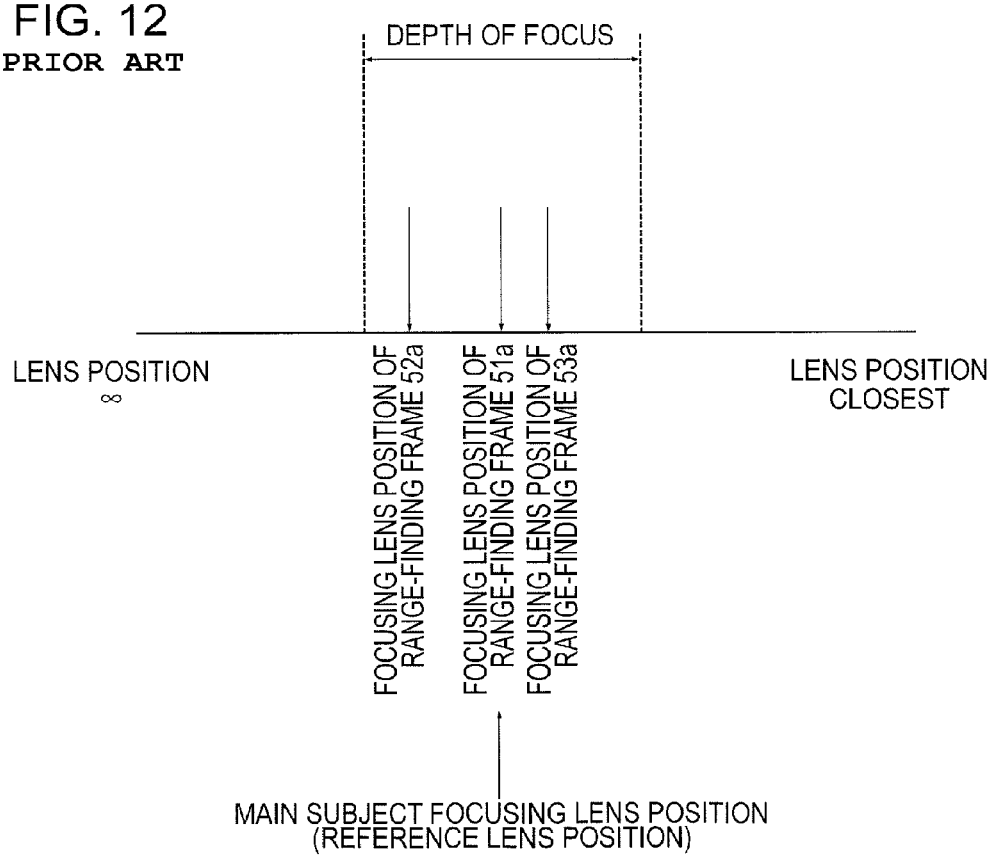
FIG. 12 is a diagram describing the relationship between focusing lens position and depth of focus in the conventional imaging apparatus.
Figure 13:
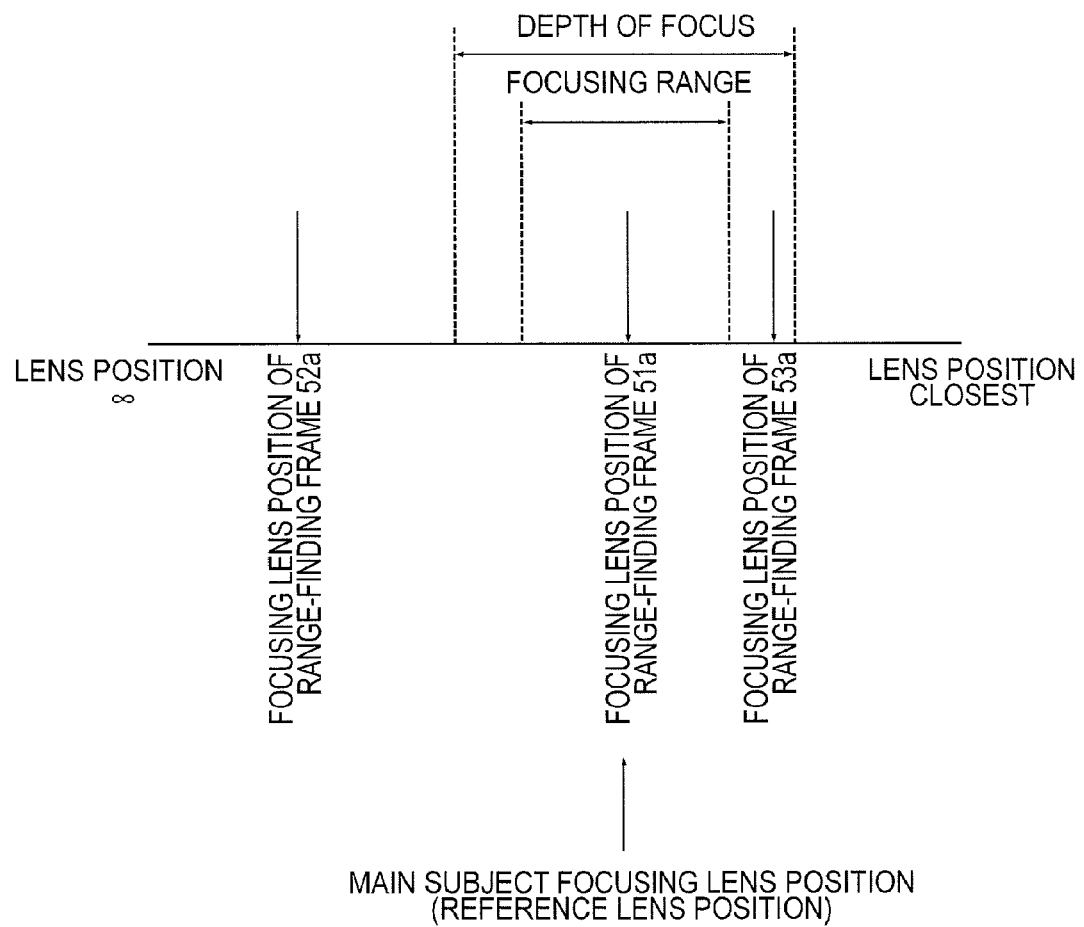
FIG. 13 is a diagram describing the relationship between focusing lens position, depth of focus, and focusing range in the conventional imaging apparatus.

If we say that of multiple regions, a focusing lens position within a predetermined range is taken as a focusing region, and the focusing range is set to be narrower than the depth of focus, when the focal length is long, the difference between the focusing lens positions of the focus lens caused due to the difference between subject distances becomes greater (see FIG. 9). Accordingly, the focusing lens position of each region included in the focusing range can be restricted, and consequently, it may be that not even the region focusing on the main subject is included in the focusing range (see FIG. 13). For example, even in the event that a focus has been detected in three regions including the same subject, the two regions are included in the focusing range, and are displayed on the screen as focusing regions, but the remaining one region is sometimes not displayed on the screen. Further, in some cases, only one region within the photographing screen is displayed. In such a case, the photographer is given an uncomfortable feeling (e.g., is misled to think the correct subject has been focused).

Conversely, with the present exemplary embodiment, the proportion between the focusing range and the depth of the depth of focus can be set so as to be changed depending on focal length. Specifically, the proportion of the focusing range to the depth of focus can be set to be greater as the focal length becomes longer. Consequently, in the event that a focal point has been detected in three regions including the same subject, a situation hardly occurs where only one region within the photographing screen is displayed. This facilitates the photographer determining whether or not the intended subject is in focus.

Further, going through a liquid crystal panel or a finder mounted on the video camera or other similar viewing device as known by one of ordinary skill, facilitates the photographer determining a focused state.

In addition, multiple regions can be divided, and also of these regions, in the event that a region in which a focusing lens position is included in the depth of focus is displayed on the screen as a focusing region, the focusing region can be displayed on the entire screen, and accordingly, the photographer is not given a bothersome feeling (e.g., misleading focusing display).

Also, in Step S207 in FIG. 3 and Step S307 in FIG. 7, the proportion between the focusing range and the depth of the depth of focus can be changed depending on focal length, but this proportion can be changed so as to be proportional to the focal length.

The features at least one exemplary embodiment can also be realized by the following method as well. First, a storing medium, in which the program code of software for realizing the functions of the exemplary embodiment are stored, is supplied to a system or an apparatus. Next, a computer (or CPU, MPU or other computing device having a microprocessor) of the system or apparatus thereof reads out the program code stored in the storing medium and executes them.

In this case, the program code itself read out from the storing medium consequently realizes the functions of the above exemplary embodiment, and at least one exemplary embodiment comprises the program code thereof and the storing medium storing the program code.

Also, as for a storing medium for supplying the program code, for example, a floppy disk, hard disk, or magneto-optical disc may be employed. Also, CD-ROM, CD-R, CD-RW, DVD-ROM, DVD-RAM, DVD-RW, DVD+RW, magnetic tape, nonvolatile memory card, ROM, or other storage element as known by one of ordinary skill in the relevant arts and equivalents can be employed. Also, the program code can be downloaded via a network.

The above description has been made wherein the functions of the above exemplary embodiment are realized by the computer reading out and executing the program code. However, the present invention is not restricted to this, an arrangement may be made where an operating system running on the computer performs part or all of the actual processing based on the instructions of the program code, and the functions of at least one exemplary embodiment are realized by the processing thereof.

Further, the following arrangement can be made. First, the program code, read out from the storing medium, is written into a function expansion board inserted in the computer, or a function expansion unit connected to the computer. Subsequently, the CPU included in the function expansion board or function expansion unit performs part or the entire portion of the actual processing, and the functions of at least one exemplary embodiment are realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-016190 filed Jan. 24, 2005, which is hereby incorporated by reference herein in its entirety.

What is claimed is:

1. An imaging apparatus comprising:
   a detecting device configured to detect a focusing state of a subject image output by an imaging device, and detects focusing positions of an image optical system for each of a multiple of AF frames within an imaging screen;
   a selecting device configured to select an AF frame from among the multiple of AF frames to obtain a focusing position of the image optical system for imaging an image;
   a determining device configured to determine whether or not the focusing positions corresponding to the multiple AF frames are within a focusing range; and
   an instructing device configured to instruct the determining device to display on the imaging screen at least one AF frame determined to be within the focusing range,
   wherein, in a case where the focusing positions are in a first focal length, a proportion of the focusing range with respect to a focal depth range of a focusing position corresponding to the AF frame selected by the selecting device is set to be larger than a case where the focusing positions are in a second focal length that is shorter than the first focal length.

2. The imaging apparatus according to claim 1, wherein the focal depth range of a focusing position corresponding to the AF frame selected by the selecting device is a focal depth range of when a diaphragm is opened.

3. The imaging apparatus according to claim 1, wherein, in the event that a focus can be detected in an AF frame near the center of the imaging screen, the selecting device selects the AF frame near the center as a frame of a focusing position which the imaging optical system brings into focus when imaging an image.

4. The imaging apparatus according to claim 1, wherein a display is not performed in a case when an AF evaluation value, associated with a focusing lens position of the subject image, is smaller than a predetermined threshold value.

5. An imaging method comprising:
   a focal point detecting step for acquiring the focusing state of a subject image output by an imaging device to detect the focusing position of an image optical system for each of a multiple of AF frames within an imaging screen;
   a selecting step for selecting an AF frame from among the multiples of AF frames to obtain a focusing position of the image optical system for imaging an image;
   a determining step for determining whether or not the focusing positions corresponding to the multiple AF frames are within a focusing range; and
   an instructing step for instructing an AF frame determined to be within the focusing range in the determining step, of the multiple AF frames, to be displayed on the imaging screen,
   wherein, in a case where the focusing positions are in a first focal length, a proportion of the focusing range with respect to a focal depth range of a focusing position corresponding to the AF frame selected in the selecting step is set to be larger than a case where the focusing positions are in a second focal length that is shorter than the first focal length.

6. A computer-readable storage medium for storing a computer-executable process, the computer executable process causing a computer to implement the method of claim 5.

7. An imaging apparatus comprising:
   a detecting device configured to detect a focusing state of a subject image output by an imaging device, and detects focusing positions of an image optical system for each of a multiple of AF frames within an imaging screen;

a selecting device configured to select an AF frame from among the multiple of AF frames to obtain a focusing position of the image optical system for imaging an image;

a determining device configured to determine whether or not the focusing positions corresponding to the multiple AF frames are within a focusing range; and an instructing device configured to instruct the determining device to display on the imaging screen at least one AF frame determined to be within the focusing range, wherein the determining device sets a proportion of the focusing range with respect to a depth of focus to be smaller as a focal length becomes shorter.

8. An imaging apparatus comprising:

a detecting device configured to detect a focusing state of a subject image output by an imaging device, and detects focusing positions of an image optical system for each of a multiple of AF frames within an imaging screen;

a selecting device configured to select an AF frame from among the multiple of AF frames to obtain a focusing position of the image optical system for imaging an image;

a determining device configured to determine whether or not the focusing positions corresponding to the multiple AF frames are within a focusing range; and an instructing device configured to instruct the determining device to display on the imaging screen at least one AF frame determined to be within the focusing range, wherein the determining device sets a proportion of the focusing range with respect to a depth of focus to be equal to the depth of focus when a focal length is a telephoto end.

* * * * *